3,428,620
ANTHRAQUINONE AZO BARBITURIC ACID
DERIVATIVE DYES
Willy Braun, Heidelberg, and Ingo Paetzke, Ludwigshafen
(Rhine), Germany, assignors to Badische Anilin- &
Soda-Fabrik Aktiengesellschaft, Ludwigshafen (Rhine),
Germany
No Drawing. Filed Feb. 18, 1966, Ser. No. 528,352
Claims priority, application Germany, Feb. 23, 1965,
B 80,663; June 9, 1965, B 82,321; Aug. 3, 1965,
B 83,115
U.S. Cl. 260—154         6 Claims
Int. Cl. C07c 49/68; C09b 29/24

ABSTRACT OF THE DISCLOSURE

Pigment dyes of the anthraquinone azo series in which the coupling component is barbituric acid, thiobarbituric acid, barbiturimide or thiobarbiturimide. The compounds are yellow pigments of good color strength and outstanding light fastness.

---

This invention relates to new dyes of the anthraquinone azo series which are suitable as pigments, and to a method of producing these dyes. The valuable dyes have the general formula:

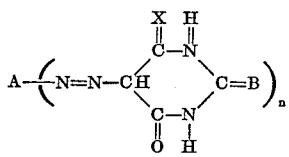

in which A denotes the radical of an anthraquinone derivative, X denotes an oxygen atom or the radical =NH, B denotes an oxygen atom, a sulfur atom or the radical =NH, and $n$ denotes one of the integers 1 to 4, preferably 1 or 2.

The dyes may be obtained for example by diazotizing an anthraquinone derivative which contains one to four diazotizable amino groups and coupling the diazo compound with a compound having the general Formula II:

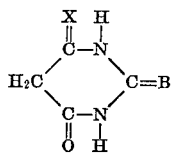

in which X and B have the above meanings.

Dyes having the Formula I in which X denotes an oxygen atom and B denotes an oxygen atom or a sulfur atom may also be obtained by diazotizing an anthraquinone derivative which contains one to four diazotizable amino groups with a compound having the Formula II in which at least one of the radicals X and B denotes the group =NH and treating the coupling product with an acid.

The new dyes may be derived from anthraquinone compounds which may contain substituents other than the said azo groups. Examples of such substituents are: chlorine atoms, bromine atoms, fluorine atoms, hydroxyl groups, alkoxy groups (such as methoxy groups and ethoxy groups), aryloxy groups (such as phenyl ether groups and diphenyl ether groups), the thioether groups of the said hydroxy groups, phenyl groups, carboxyl groups or carbamyl groups, which may bear radicals, such as methyl, ethyl, phenyl, halophenyl, alkylphenyl, benzyl or anthraquinonyl groups, as substituents, primary, secondary or tertiary amino groups, which contain aliphatic, aromatic or heterocyclic radicals, such as the groups having the formulae:

—NHCH₃, —NHC₂H₅, —N(CH₃)₂, —N(C₂H₅)₂, —NHC₂H₄OH

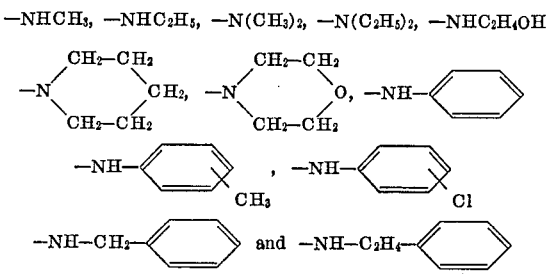

and acylamino groups, such as the groups having the formulae:

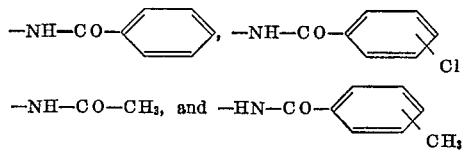

Acylamino groups and particularly halogen atoms are preferred among these substituents. The diazotizable amino groups may be attached direct to the anthraquinone nucleus or to the said aryl substituents.

The anthraquinone radical may be derived from an anthraquinone compound which contains a carbocyclic or heterocyclic ring attached to the anthraquinone nucleus by condensation. The following are given as examples: benzanthraquinones, benzanthrones, pyrazolanthrones, anthrapyrimidines, anthrapyridones, anthraquinoneacridones, anthramides, anthrimidecarbazoles, and anthraquinones having a pyrene, diazapyrene or perylene nucleus. New dyes having the general Formula III:

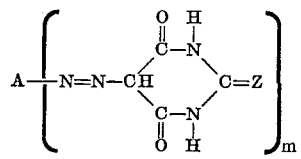

in which A denotes the radical of an anthraquinone derivative, Z denotes an oxygen atom or the group =NH and $m$ denotes one of the integers 1 and 2 are of particular industrial interest.

Examples of coupling components are barbituric acid, thiobarbituric acid, barbiturimide and thiobarbiturimide. It is known that barbituric acid may be prepared either by condensation of malonic esters (obtainable from cyanoacetic esters) with urea or by hydrolysis of barbiturimide-4 (obtainable from cyanoacetic esters and urea). In both cases, cyanoacetic ester is the starting product. Barbiturimide or thiobarbiturimide is readily accessible from cyanoacetic ester and urea or thiourea.

According to the process for the production of the new dyes, anthraquinone derivatives having one to four diazotizable amino groups (and which may contain the above mentioned substituents) are diazotized by conventional methods and coupled with compounds having the general Formula II. The diazotizable amino groups in the anthraquinone compounds are thus converted into the corresponding azo groups. If the aminoanthraquinones contain more tha none diazotizable amino group, however, the process may be carried out so that only partial diazotization of the amino groups takes place. In this case anthraquinone azo dyes are obtained which contain primary amino groups as well as azo groups.

Diazotization and coupling are advantageously carried out by dissolving the aminoanthraquinone compound in concentrated sulfuric acid and effecting diazotization by adding nitrosylsulfuric acid or sodium nitrite. Some time later the reaction mixture is poured onto ice and the sparingly soluble diazonium salt is suction filtered. In many cases it is more advantageous to allow the sulfuric acid solution of the aminoanthraquinone compound to drip into a solution of sodium nitrite containing crushed ice and to suction filter the diazonium sulfate some time later. Diazotization may be facilitated by adding dispersion agents. For coupling, the diazonium salt is then united with an aqueous alkaline solution of the coupling component. The duration of coupling upon introduction of all of the diazonium salt is usually half to three hours but may be extended to twenty-four hours.

When dyes having the Formula I in which at least one of the radicals X and B denotes the =NH group are obtained, these imino groups may be hydrolyzed with acids, for example sulfuric acid or hydrochloric acid. This variant of the process is advantageous as regards the yield of cyanoacetic ester because hydrolysis of the imino group in the finished dye can be effected with less waste than the hydrolysis of barbiturimide or thiobarbiturimide to barbituric acid or thiobarbituric acid followed by coupling. Furthermore if for example sulfuric acid be used for hydrolysis of the imino group, purification of the coupling product may be carried out by fractional precipitation and conversion of the dye into a pigment form by swelling and fine dispersion in one operation.

To isolate the dye, the reaction product may be suction filtered and washed with dilute acid and then with water. For removal of moisture and for purification, it may finally be washed with organic solvents, such as alcohol or acetone. If necessary, the dyes may be further purified by boiling up with dimethylformamide or N-methylpyrrolidone. In many cases however fractional precipitation from concentrated sulfuric acid with water, alcohol or dimethylformamide is preferred. In other respects the conventional pigment finishing methods may be used.

The new dyes are very sparingly soluble in water and organic solvents. This is surprising because for example the coupling product from 1-aminoanthraquinone and acetoacetic anilide (conventionally used in pigment chemistry as a coupling component) is considerably more soluble in water. The new dyes, particularly those which contain barbiturimide-(2) as coupling component, are eminently suitable as pigment dyes because they are difficultly soluble. They are yellow pigments having good color strength and outstanding light fastness, the pigments having barbiturdiimide-(2,4) as coupling component being the most reddish in shade.

The invention is illustrated by the following examples in which the parts specified are parts by weight.

Example 1

22.5 parts of 1-aminoanthraquinone is dissolved in 280 parts of concentrated sulfuric acid. The solution is dripped into a mixture of 12 parts of sodium nitrite and 1000 parts of ice, the mixture stirred for another hour, the excess of nitrite then destroyed with sulfamic acid and the diazonium salt is suction filtered. The residue is stirred into 3000 parts of ice-water and the pH value is adjusted to 4 with sodium acetate. The suspension is then added in portions to a solution of 17 parts of barbiturimide-(2), 30 parts of sodium carbonate and 2000 parts of ice-water. The pH value is adjusted to 9 during coupling. When stirring has been continued for five hours, the product is suction filtered and washed with water. The residue is stirred with hot water and made acid. It is again suction filtered and washed with methanol. A yellow pigment having the formula:

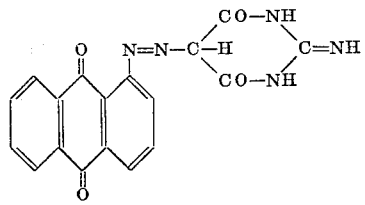

is obtained in almost a quantitative yield. It is practically insoluble in organic solvents.

Example 2

Starting from 26 parts of 1-amino-4-chloroanthraquinone, the diazonium salt is prepared by the method described in Example 1 and coupled in an analogous way with 17 parts of barbiturimide-(2). A greenish yellow pigment having the formula:

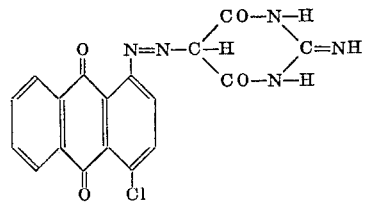

is obtained.

Example 3

90 parts of 1-aminoanthraquinone is diazotized as described in Example 1. The diazonium salt is stirred into 5000 parts of ice-water. The pH value is adjusted to 4 and the suspension is poured in portions into a solution of 62 parts of barbiturdiimide-(2,4) and 50 parts of sodium carbonate in 7000 parts of ice-water. During coupling the pH value is kept at 8 to 9. Two to three hours later, the residue is suction filtered and washed as described in Example 1. A reddish yellow pigment having the formula:

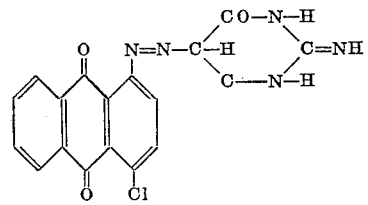

is obtained in almost a quantitative yield. Similar pigment dyes may be prepared in the same way using the starting materials set out in the following table in which imide denotes barbiturimide-(2) and diimide denotes barbiturdiimide-(2,4).

| Example | Diazo component | Coupling component | Color of pigment |
| --- | --- | --- | --- |
| 4 | 1-amino-4-chloroanthraquinone | Diimide | Yellow. |
| 5 | 1-amino-5-chloroanthraquinone | Imide | Greenish yellow. |
| 6 | 1-amino-3-chloroanthraquinone | do | Yellow. |
| 7 | 1-amino-6,7-dichloroanthraquinone | do | Do. |
| 8 | 1-amino-5-benzoylaminoanthraquinone | do | Do. |
| 9 | 1,5-diaminoanthraquinone (tetrazotized) | do | Do. |
| 10 | 2-aminoanthraquinone | Diimide | Do. |
| 11 | Bz.(1)-aminobenzanthrone | Imide | Red. |
| 12 | Bz.(1)-aminobenzanthrone | Diimide | Red. |
| 13 | 2,7-diaminobenzanthrone (tetrazotized) | Imide | Red. |
| 14 | 1,4-bis-(p-aminophenylamino)-anthraquinone (tetrazotized) | do | Grey. |

Example 15

22.5 parts of 1-aminoanthraquinone is dissolved in 150 parts of concentrated sulfuric acid and the solution is slowly added to a mixture of 10 parts of sodium nitrite and 1000 parts of ice and water. The whole is stirred for another hour during which another 3 parts of sodium nitrite is added and then the product is suction filtered, washed with a little water and the residue is stirred into 2000 parts of water. The excess of nitrite is destroyed with urea or sulfamic acid.

The suspension is then added to a solution consisting of 19.5 parts of barbituric acid, 16.5 parts of sodium carbonate and 2000 parts of water. The pH is adjusted to 8 to 9 during coupling. Two hours later the pigment formed is suction filtered and washed with water, dilute hydrochloric acid and again with water. The pigment having the formula:

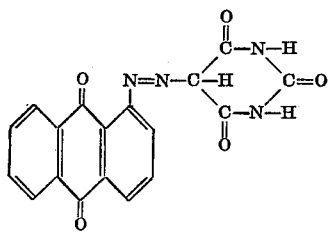

is obtained in almost a quantitative yield. It dissolves in concentrated sulfuric acid with a yellow red color and is practically insoluble in the conventional solvents. It does not melt at less than 360° C. The pigment is pure yellow and is distinguished by high color strength and good fastness to light.

The following compounds, none of which melts at less than 300° C., are prepared in the same way; acid denotes barbituric acid and thioacid denotes thiobarbituric acid.

added. The whole is stirred for an hour, the excess of nitrite is destroyed with sulfamic acid and the product is suction filtered. The residue is then stirred into 3000 parts to 4000 parts of ice-water and the pH value is adjusted to 4. The suspension is added to a solution of 17 parts of barbiturimide (prepared from cyanoacetic ester and urea) and 20 parts of sodium carbonate in 1500 parts of water, and the mixture is stirred for another four hours. The dye is suction filtered and washed with dilute hydrochloric acid and with water. The compound having the formula:

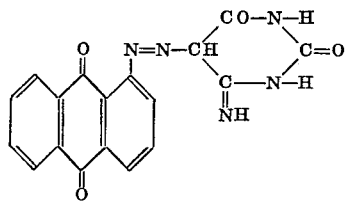

which does not melt at less than 300° C. is obtained in a good yield.

18 parts of the compound prepared according to paragraph 1 of this example is dissolved in 150 parts of concentrated sulfuric acid; the mixture is stirred for one hour at room temperature and for three hours at 50° to 60° C. The whole is poured onto ice and the product is suction filtered and washed with water. The compound formed is identical with that according to Example 1. The product may be worked up by fractional precipitation of the pigment with water.

The same results are obtained by carrying out the hydrolysis with dilute sulfuric acid or hydrochloric acid.

We claim:

1. A dye having the formula

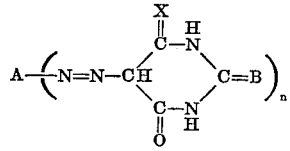

|  | Diazo component | Coupling component | Color of pigment |
|---|---|---|---|
| Example: | | | |
| 16 | 1-amino-4-chloroanthraquinone | Acid | Greenish yellow. |
| 17 | 1-amino-5-chloroanthraquinone | do | Do. |
| 18 | 1-amino-3-chloroanthraquinone | do | Yellow. |
| 19 | 1-amino-6,7-dichloroanthraquinone | do | Do. |
| 20 | 1-amino-3-bromoanthraquinone | do | Do. |
| 21 | 1-amino-5-benzoylaminoanthraquinone | do | Do. |
| 22 | 1,5-diaminoanthraquinone (tetrazotized) | do | Do. |
| 23 | 1-amino-4-benzoylaminoanthraquinone | do | Orange red. |
| 24 | 2-aminoanthraquinone | do | Greenish yellow. |
| 25 | Bz.(1)-aminobenzanthrone | do | Red. |
| 26 | 2,7-diaminobenzanthrone | do | Yellow. |
| 27 | 6-Bz.(1)-diaminobenzanthrone | do | Violet. |
| 28 | 4-aminobenzacridone | do | Do. |
| 29 | aminoviolanthrone | do | Blue grey. |
| 30 | 1-aminoanthraquinone-6-carboxylic acid | do | Yellow. |
| 31 | 1-aminoanthraquinone-6-carboxylic amide | do | Do. |
| 32 | 1-aminoanthraquinone | Thioacid | Do. |
| 33 | 1-amino-4-chloroanthraquinone | do | Do. |
| 34 | 1-amino-6,7-dichloroanthraquinone | do | Do. |
| 35 | 2-para-aminophenylanthraquinone | Acid | Do. |
| 36 | 1,4-bis-(p-aminophenylamino)-anthraquinone | do | Black. |

Example 37

22 parts of 1-aminoanthraquinone is dissolved in 150 parts of concentrated sulfuric acid and dripped into 12 parts of sodium nitrite in 1000 parts of ice-water. While the solution is being dripped in, about 500 parts of ice is added.

in which A denotes a member selected from the group consisting of anthraquinonylbenzanthronyl, benzacridonyl, dibenzanthronyl, anthraquinonyl and anthraquinonyl substituted by chlorine, bromine, benzylamino, phenylamino, carboxylic acid or carboxylic acid amide, X denotes a member selected from the group consisting of oxygen and =NH, B denotes a member selected from the group consisting of oxygen, sulfur and =NH, and $n$ denotes one of the integers 1 and 2.

2. The dye according to claim 1 and having the formula:

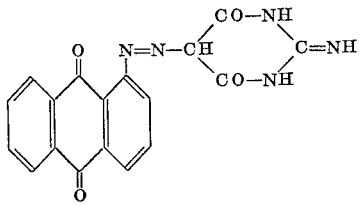

3. The dye according to claim 1 and having the formula:

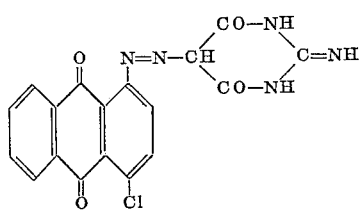

4. The dye according to claim 1 and having the formula:

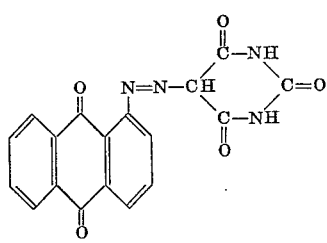

5. The dye according to claim 1 and having the formula:

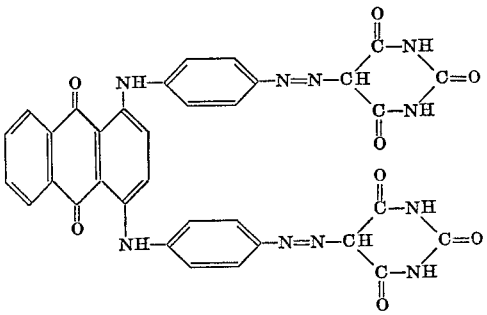

6. The dye according to claim 1 and having the formula:

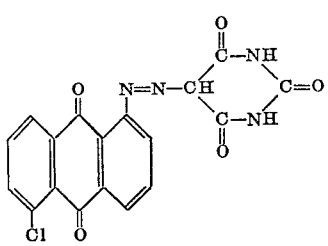

References Cited

UNITED STATES PATENTS

| | | | |
|---|---|---|---|
| 2,860,129 | 11/1958 | Gunst | 260—154 XR |
| 2,871,234 | 11/1959 | Bergstrom | 260—148 XR |
| 3,320,233 | 5/1967 | Braun et al. | 260—154 XR |

FLOYD D. HIGEL, *Primary Examiner.*

U.S. Cl. X.R.

106—288; 260—260, 274, 354, 377, 378, 381,